United States Patent [19]
Emma et al.

[11] Patent Number: 5,636,364
[45] Date of Patent: Jun. 3, 1997

[54] METHOD FOR ENABLING CONCURRENT MISSES IN A CACHE MEMORY

[75] Inventors: Philip G. Emma, Danbury, Conn.; Joshua W. Knight, III, Mohegan Lake, N.Y.; Thomas R. Puzak, Ridgefield, Conn.

[73] Assignee: International Business Machines Corporation, Armonk, N.Y.

[21] Appl. No.: 347,972

[22] Filed: Dec. 1, 1994

[51] Int. Cl.[6] ............................ G06F 12/08; G06F 13/14
[52] U.S. Cl. ............................ 395/467; 395/460
[58] Field of Search ............................ 395/460, 461, 395/458, 457, 477, 478, 467

[56] References Cited

U.S. PATENT DOCUMENTS

| | | | |
|---|---|---|---|
| 4,794,521 | 12/1988 | Ziegler et al. | 364/200 |
| 4,916,604 | 4/1990 | Yamamoto et al. | 364/200 |
| 4,964,041 | 10/1990 | Jeremiah et al. | 364/200 |
| 5,455,924 | 10/1995 | Shenoy et al. | 395/445 |

OTHER PUBLICATIONS

IBM Technical Disclosure Bulletin, "A Protocol for Processing Concurrent Misses", Dec. 1993, vol. 36 No. 12.
IBM TDB vol. 25 #11B Apr. 1983 "Design for Improved Cache Performance via Overlapping of Cache Miss Sequences" G. Driscoll et al pp. 5962–5966.
IBM TDB vol. 22 #12 May 1980 "Using a Branch History Table to Prefetch Cache Lines" R. Rechtschaffen p. 5539.
IBM TDB vol. 32 #7 Dec. 1989 "Cache Miss Leading Edge Processing" Puzak et al pp. 274–275.

Primary Examiner—Eddie P. Chan
Assistant Examiner—Kevin L. Ellis
Attorney, Agent, or Firm—Robert P. Tassinari, Jr.

[57] ABSTRACT

In a cache-to-memory interface, a means and method for timesharing a single bus to allow the concurrent processing of multiple misses. The multiplicity of misses can arise from a single processor if that processor has a nonblocking cache and/or does speculative prefetching, or it can arise from a multiplicity of processors in a shared-bus configuration.

15 Claims, 9 Drawing Sheets

UNIPROCESSOR W/MULTIPLE MISS FACILITIES

UNIPROCESSOR SYSTEM

FIG. 1
PRIOR ART

FIG. 2
PRIOR ART
DIRECTORY BASED MULTIPROCESSOR

SHARED BUS MULTIPROCESSOR

UNIPROCESSOR W/MULTIPLE MISS FACILITIES

FIG. 5

DIRECTORY BASED MULTIPROCESSORS WITH MULTIPLE MISS FACILITIES

FIG. 6

SHARED BUS MULTIPROCESSOR WITH MULTIPLE MEMORY MISS FACILITIES

FIG. 7
SHARED BUS MULTIPROCESSOR

METHOD FOR ENABLING CONCURRENT MISSES IN A CACHE MEMORY

FIELD OF THE INVENTION

The invention relates to memory systems.

BACKGROUND OF THE INVENTION

In a buffer control element (BCE), also commonly called a "cache", data is stored in quanta called "lines". A line contains a plurality of sequential "words;" a word is the quantum on which the central processor (CP) operates. Lines are aligned on "line boundaries." That is to say, the 0th word in the line has a relative address of 0 in the line.

If the CP references a word that is not in the BCE, this event is called a "cache miss." When a cache miss occurs, the line that contains the word that generated the miss is fetched from the memory system, and is stored in the BCE for use by the processor.

Figure 1:
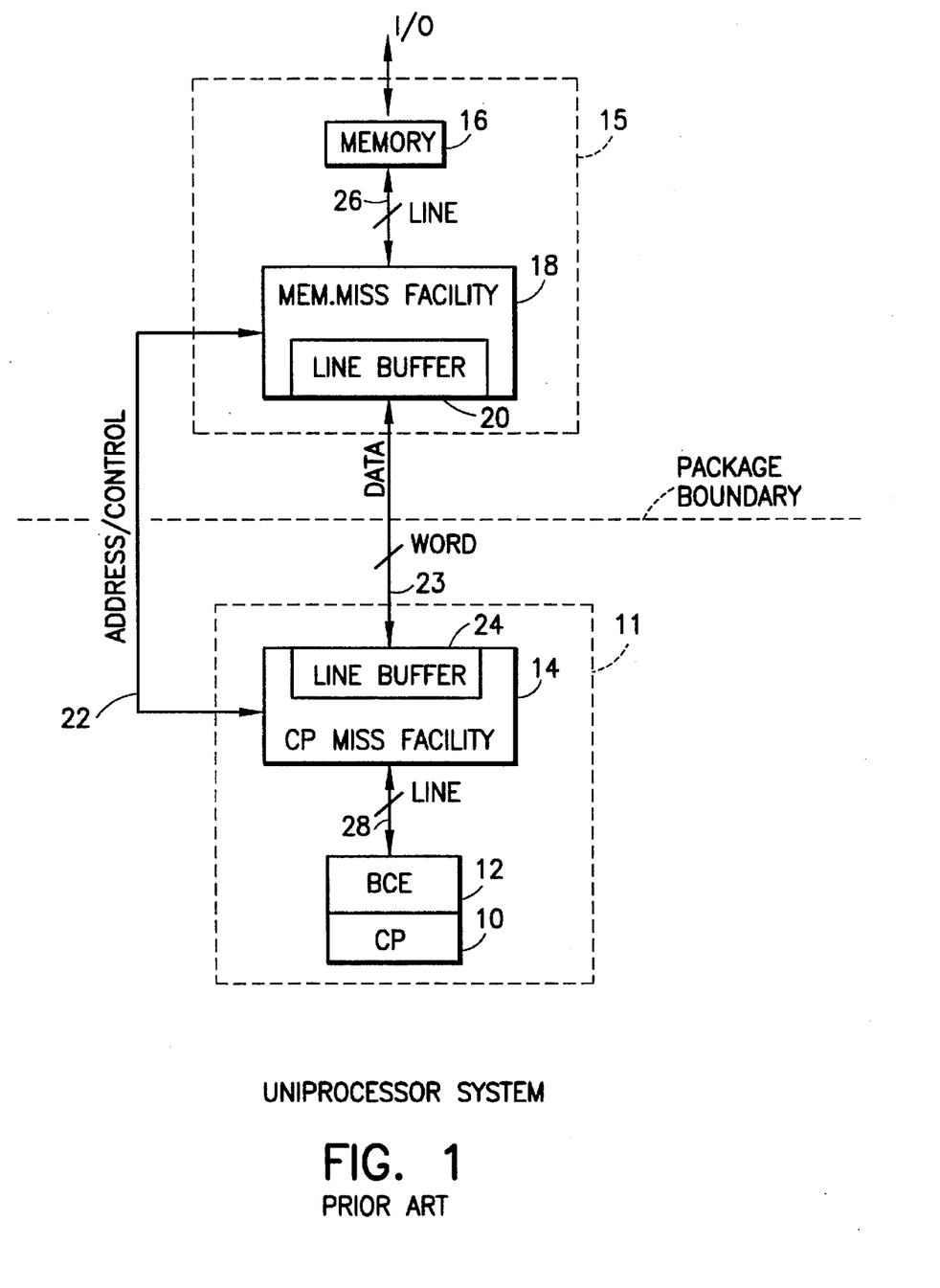
FIG. 1 is a uniprocessor system employing a cache in accordance with the prior art.
Figure 8:
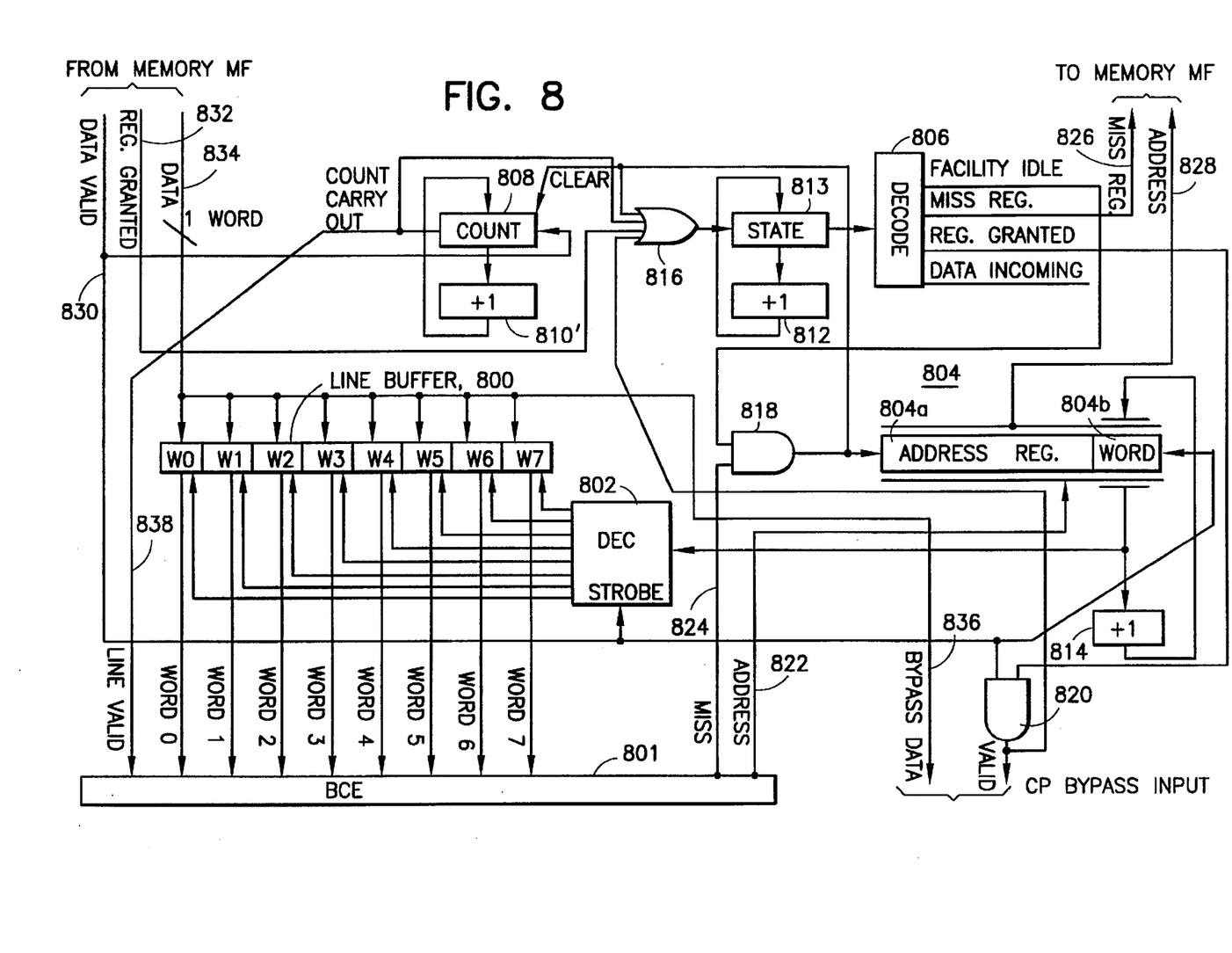
FIG. 8 is a schematic diagram of a preferred implementation of a processor miss facility in accordance with the invention.
Figure 9:
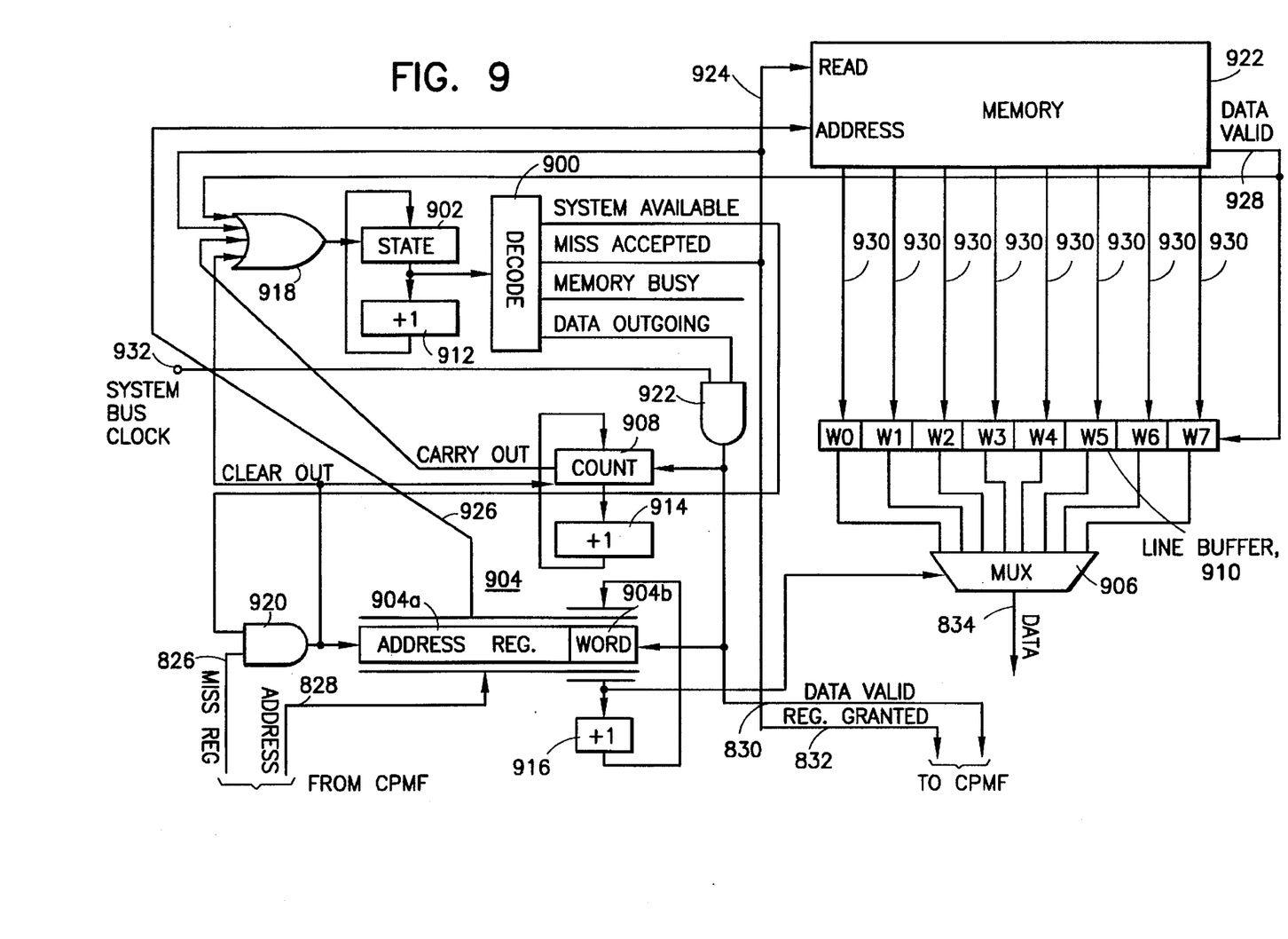
FIG. 9 is a schematic diagram of a preferred embodiment of a memory miss facility in accordance with the invention.

FIG. 1 shows a prior art uniprocessor system 11 connected to a memory system 15. The uniprocessor system comprises a CP 10, a BCE 12, and a CP miss facility (CPMF) 14. The memory system 15 comprises a memory 16, and a memory miss facility (MMF) 18. Each miss facility (MMF and CPMF) contains a line buffer 20 and 24 that is used to buffer a line of data while it is being transferred from one system to the other. The miss facilities, preferred embodiments of which are shown in FIGS. 8 and 9, are preferably logic circuits on the memory or processor chips, each circuit including a line buffer and logic suitable for carrying out the functions to be described in greater detail below.

Note that within the memory system 15, the MMF 18 moves lines between itself and the memory 16 en masse via bus 26. And within the uniprocessor system 11, the CPMF 14 moves lines between itself and the BCE 12 en masse via bus 28. But the connection between the two miss facilities is generally much smaller than a line, e.g., it could be a single word.

In an ideal world, we could remove both miss facilities from the picture, connect the memory 16 directly to the BCE 12, and move lines back-and-forth between the memory and the BCE en masse. The memory and the BCE, however, reside on different chips, which are coupled by wordwidth buses. Thus, the reasons that the miss facilities are required are:

1. A buffering mechanism and some minimal control is required to disassemble lines into words, and reassemble the words back into lines when the line is moved across the word-wide interface.

2. Were there multiple processors or multiple memory systems in the picture, there would be a requirement to do some arbitration and buffering to handle situations in which multiple processors were requesting the use of the memory system.

Although a seemingly obvious way to improve speed might be to increase interface size from one word to one line, the width of the interface is limited by one of two things:

1. There must be one physical pin per bit in the interface. Thus, the physical packaging will determine the maximum number of pins that can be implemented.

2. The total number of pins that are implemented may all switch simultaneously. Thus, the power system must be able to provide enough peak current to the chips to allow this many signals to switch.

The physical limits of either of the above are typically much smaller than the desirable size of a cache line.

Note that when a cache miss occurs, the words in the line that are moved are not moved across the interface in arbitrary order. Rather, the CPMF 14 issues the miss to the memory system by using the address of the word that caused the miss. This address is passed on the address/control bus 22 shown in FIG. 1. The MMF 18 then fetches the appropriate line (corresponding to this address) from the memory 16, and buffers it in the MMF line buffer 20. The MMF 18 then transfers the words of the line (stored in line buffer 20) to the CPMF 14, via data bus 23, beginning with the word that generated the miss, and continuing in sequence, wrapping the address around to the beginning of the line, until all words have been transferred. The words are buffered in the CPMF line buffer 24 as they arrive. After all words have been transferred to the line buffer 24 in the CPMF, the line is moved to the BCE 12 en masse.

If the CP were stopped for the entire duration of every miss, the BCE would be called a "blocking cache." Blocking caches cause all action in their CP to stop until all data has been moved. Were it the case that the system had a blocking cache, then the order in which words were moved would make no difference to performance. There would also not be any need for a line buffer in the CPMF; instead, the data words could be put directly into the BCE as they arrived.

In a "nonblocking cache," the CP can continue to run while the miss is in progress. In this case, the line buffer in the CPMF serves the purpose of not taking BCE bandwidth away from the CP while the miss is in progress. The reason that the words of the miss are returned starting with the word that generated the miss is that the CP needs that word as soon as possible. Typically, the first few words that arrive are bypassed through the CPMF directly to the CP as soon as they arrive. This will usually allow the CP to perform work while the miss is still in progress.

With a blocking cache, the penalty for a miss is the sum of the following factors:

1. The time it takes for the CPMF to issue the miss to the MMF.

2. The time for the MMF to access the memory, and to put the line into the MMF line buffer. This is usually called the "memory access time."

3. The time for the MMF to move the line to the CPMF. This is equal to the number of words in a line times the bus cycle time.

4. The time for the requested word to be moved from the line buffer in the CPMF to the CP.

With a nonblocking cache, if it is the case that the miss has stopped CP action for logical reasons (i.e., the CP needs the word that missed before it can do anything else), then the CP can restart work as soon as the first word arrives at the CPMF line buffer.

Therefore, it is easy to see that the miss penalty can be separated into two independent terms:

1. A term that depends on the memory access time. This is called the "leading edge" delay. Roughly speaking, the leading edge delay is equal to the miss penalty for the same system if the line size were a single word.

2. A term that depends on the line size. This term is called the "trailing edge" delay. Roughly speaking, this term is the difference between the actual miss penalty and the leading edge delay (where "miss penalty" is defined as being the difference between the time it takes to access data when there is a miss and the time it takes to access data when there is not a miss). This term accounts for the fact that multiple words are moved.

If it were the case that misses always happened far apart in time, then there would be no interaction between misses. The miss penalty for a system having a nonblocking cache would be equal to the leading edge delay, i.e., there would be no negative effects of moving lines across a word-interface.

In fact, misses do cluster in time; it is frequently the case that upon receiving the first word back from the CPMF interface, the CP will immediately miss again. When this happens, the miss cannot be issued because the CPMF and the MMF are busy finishing the previous miss; the amount of time that they will remain busy is proportional to the number of words in a line. This is the principle contributor to trailing edge delay in systems like the one shown in FIG. 1.

Figure 2:
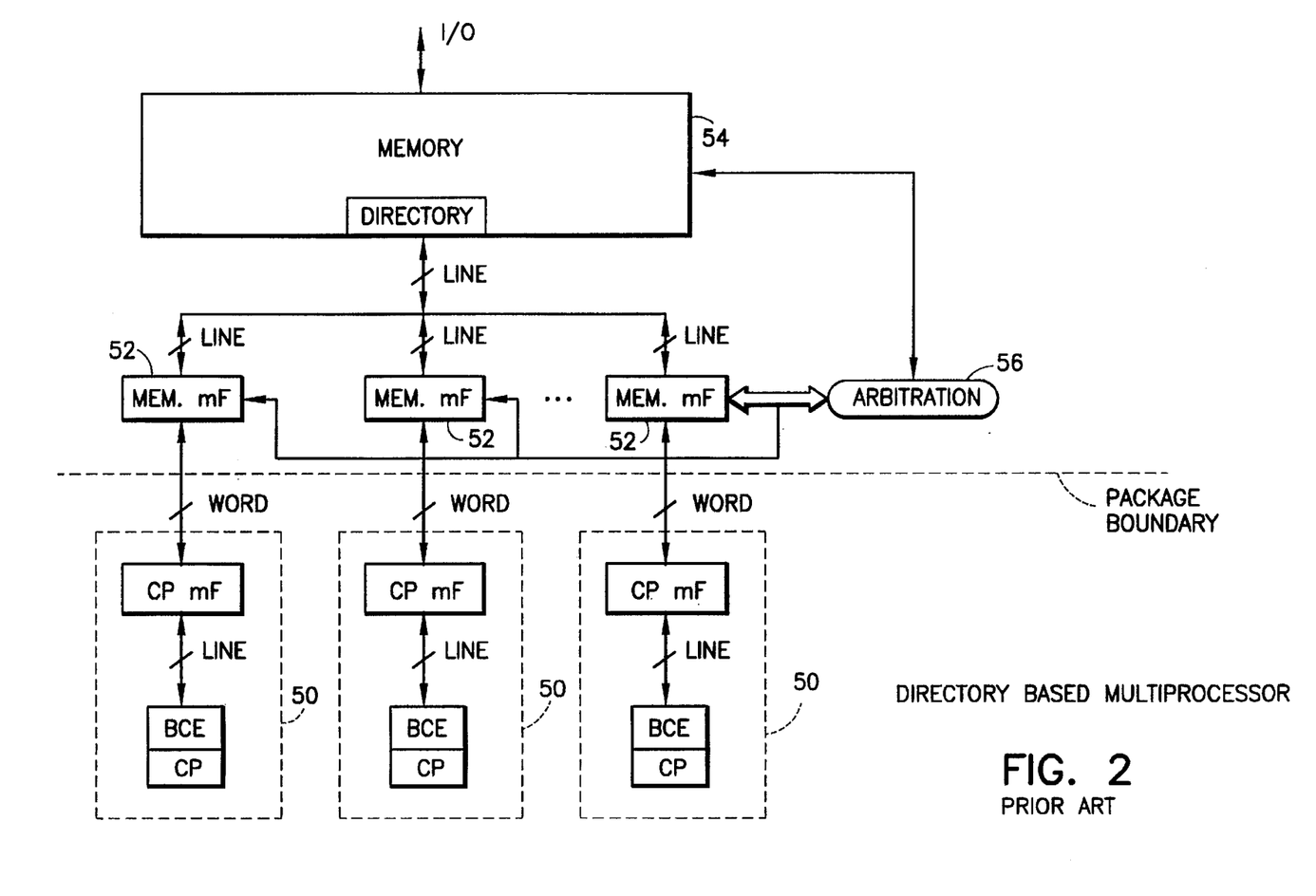
FIG. 2 is a directory-based multiprocessor system in accordance with the prior art in which each cache has an associated CP miss facility and an associated memory miss facility.

FIG. 2 shows a prior art directory-based multiprocessor system (MP) that is a straightforward extrapolation of FIG. 1. In this system, there are a number of uniprocessor systems 50 each of which has a dedicated interface to the memory system. Each uniprocessor system is identical to the uniprocessor system in FIG. 1, but the memory system now contains a multiplicity of MMFs; one per uniprocessor system. Each MMF interacts with the uniprocessor system to which it is connected.

The memory 54 is accessed by all MMFs. Since more than one MMF can attempt to fetch a line from memory at the same time, some arbitration control is necessary, and is provided by arbitration control 56. This control allows one MMF to access memory at any time, and it chooses MMFs so as to allow accesses from all processors to be serviced eventually.

For the purposes of this discussion, FIG. 2 is merely a generalization of FIG. 1. As seen by any processor in the system, the system in FIG. 2 behaves identically to the system in FIG. 1 except that there is another factor that contributes to the leading edge delay. This factor is a queuing delay that depends on the number of processors in the system, and on the memory access time. Very simply, adding more processors to the system increases the aggregate traffic to the memory, hence its utilization, hence the probability that it is busy when a MMF requests service.

The trailing edge effect is not further exacerbated by a processor's being placed into a directory-based MP system like the one in FIG. 2.

Figure 3:
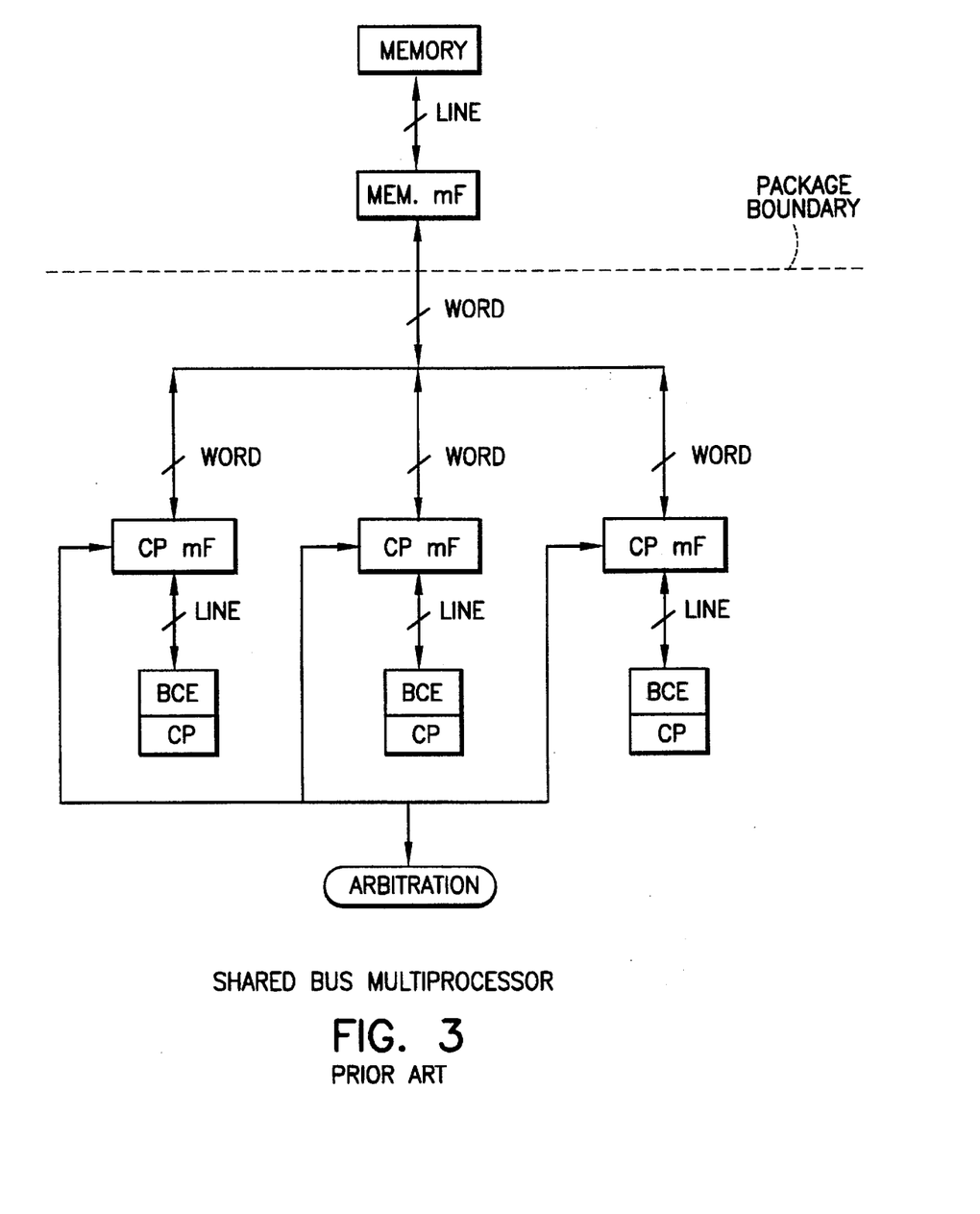
FIG. 3 is a shared-bus multiprocessor system in accordance with the prior art.

Another type of known MP system is the shared-bus multiprocessor as shown in FIG. 3. This system is different than the one in FIG. 2 principally in that the processors do not have dedicated ports to the memory system. Instead, there is a single port to the memory system, and all processors must share this port. The arbitration control that was shown in FIG. 2 is still present in FIG. 3. In FIG. 2, that control arbitrated between the MMFs that vied for the memory; in FIG. 2, that control arbitrates between the CPMFs that vie for the bus.

Recall that the queuing delay in FIG. 2 was proportional to the memory access time, but was independent of the number of words in a line. This was because the shared resource in FIG. 2 was the memory, and the memory is accessed on the basis of lines. In essence, a miss could only be delayed by the leading-edge portion of the previous miss.

In FIG. 3, the queuing delay is proportional to the entire miss penalty. This is because the shared resource that is being contended is the bus—and the bus is used for the duration of the entire miss. Therefore, the number of words in a line not only contributes to the trailing edge of the processor that generates a miss, but it also adds a factor to the leading edges of the other processors' misses.

And finally, in the context of all three systems mentioned above, it should be apparent that speculative prefetching is not an easy feat. A "speculative prefetch" is a fetch that the hardware or software of a processor issues to the memory hierarchy in anticipation of needing the referenced data at a later time. This is done in the hope that if the need for data is anticipated far enough ahead, the miss for that data will be completed prior to the time that the data is actually needed. Therefore, the processor will not suffer miss penalty if it can prefetch effectively.

But note that a speculative prefetch utilizes the miss facilities, the memory, and the bus. For all intents and purposes, a speculative prefetch "looks like" any other miss insofar as it impacts the other miss-traffic in the system. Therefore, speculative prefetching can actually delay the real misses in a system, and can degrade the overall performance of the system even when it is done correctly.

SUMMARY OF THE INVENTION

The present invention reduces the trailing edge effects that arise when coincident misses interfere with each other because of having to share a resource, in this case, a bus. This situation arises in at least three contexts:

1. In a uniprocessor, this happens when misses occur in immediate succession. In this case, bus contention prevents a second miss from starting until the first miss completes. This situation is exacerbated by high-performance techniques that reduce the average processing latency of instructions, a.k.a., "cycles per instruction" (CPI). This is because the "miss rate," which is the average number of misses per instruction, is independent of the rate at which the instructions are processed. There are four current high-performance techniques that will exacerbate these effects. These are: i) exotic circuit-design techniques that drive the cycle-time significantly below 10 nanoseconds; ii) superscalar organizations which increase instruction-level parallelism; iii) very long instruction word (VLIW) organizations which increase instruction-level parallelism; and iv) multithreaded processors in which multiple instruction streams are time-sliced onto a single processor.

2. In shared-bus multiprocessor designs, the misses that are generated by the aggregation of the individual processors' misses must all use the same bus.

3. In any situation in which speculative prefetching is used, each prefetch behaves in a manner that is indistinguishable from a miss. Therefore, as the prefetch-traffic utilizes the resources in the system—especially the bus, it necessarily interferes with the ongoing miss-traffic in the system.

Note that in the special case of a multithreaded processor, the miss traffic is exacerbated in two different ways:

1. The higher rate of instruction processing will cause the misses to cluster, as is also the case with superscalar and VLIW processors.

2. Since the BCE must now support multiple threads, the amount of buffer storage that is available for use by each thread is reduced. This causes the miss rate per thread to increase.

The present invention provides a means and method for processing multiple misses concurrently on a single bus between the processor's cache or a plurality of processors' caches, and the main memory.

The invention employs a novel set of control signals that are sent to the memory system with a miss, and a novel set of control signals that are sent back to the processor with each datum.

The set of control signals that is sent with a miss specifies three pieces of information:

1. A tag that identifies which of n misses the information on the address bus corresponds to when the miss is generated. In this case, n is the maximum number of simultaneous misses that can be serviced by the bus. This tag is some number, i (modulo n), where the $i^{th}$ miss facility is being used to handle the miss at the processor interface. Of course, it is this same signal "i" that is returned with the data words by the memory system in the second set of control signals. Note that n line buffers must be added to each side of the bus to buffer the aggregate traffic from the n misses.

2. An indication of which one of k possible preemption schemes are to be used when servicing the associated miss.

3. An indication of which one of m possible priority levels is to be associated with the miss.

The control signals that are sent back to the processor identify the miss facility for which the accompanying data are intended. Therefore, the new control information that is sent with a miss requires $\log_2(n)+\log_2(k)+\log_2(m)$ lines. In a minimal implementation, n=2, k=2, m=1, so the total number of new lines is 2. In a full-blown implementation, there could be n=8, k=4, m=4, so the total number of new lines is 7.

DETAILED DESCRIPTION

In a uniprocessor, one means for allowing two misses to be processed concurrently is to provide two busses.

This is not a practical or desirable solution, however, because additional I/O capability—if it were feasible—is much better spent doubling the width of the bus. Additional bus width benefits every miss, whether clustered or isolated, by reducing its trailing edge.

Instead of the width-doubling solution, however, this invention provides a means and method for timesharing a single bus, thereby affording the broadest possible transfer width to any single miss, while allowing for multiple misses to proceed concurrently. Specifically, a means and method are provided that allow for the immediate servicing of the leading edge of a miss via preemptive handling of outstanding trailing edges. This is demonstrated below for two different environments.

The first environment is the uniprocessor that suffers from clustered misses. This is the environment that was shown in FIG. 1. The misses on a uniprocessor cluster naturally because of the code running on the processor, they cluster when high-performance techniques are used, they cluster when multithreading is used, and they cluster when speculative prefetching is done. This environment is extrapolated straightforwardly to a directory-based multiprocessor, which is a multiprocessor organization in which each processor has a dedicated bus to the memory system. This is the type of system that was shown in FIG. 2.

The second environment is the shared-bus multiprocessor in which multiple processors share a bus to the memory system. This is the environment that was shown in FIG. 3. Again, the uniprocessors within this system can further use any of the techniques that were mentioned above: superscalar, VLIW, multithreading, or prefetching. These things merely make the present invention even more useful.

The Uniprocessor, and the Directory-Based Multiprocessor

Figure 4:
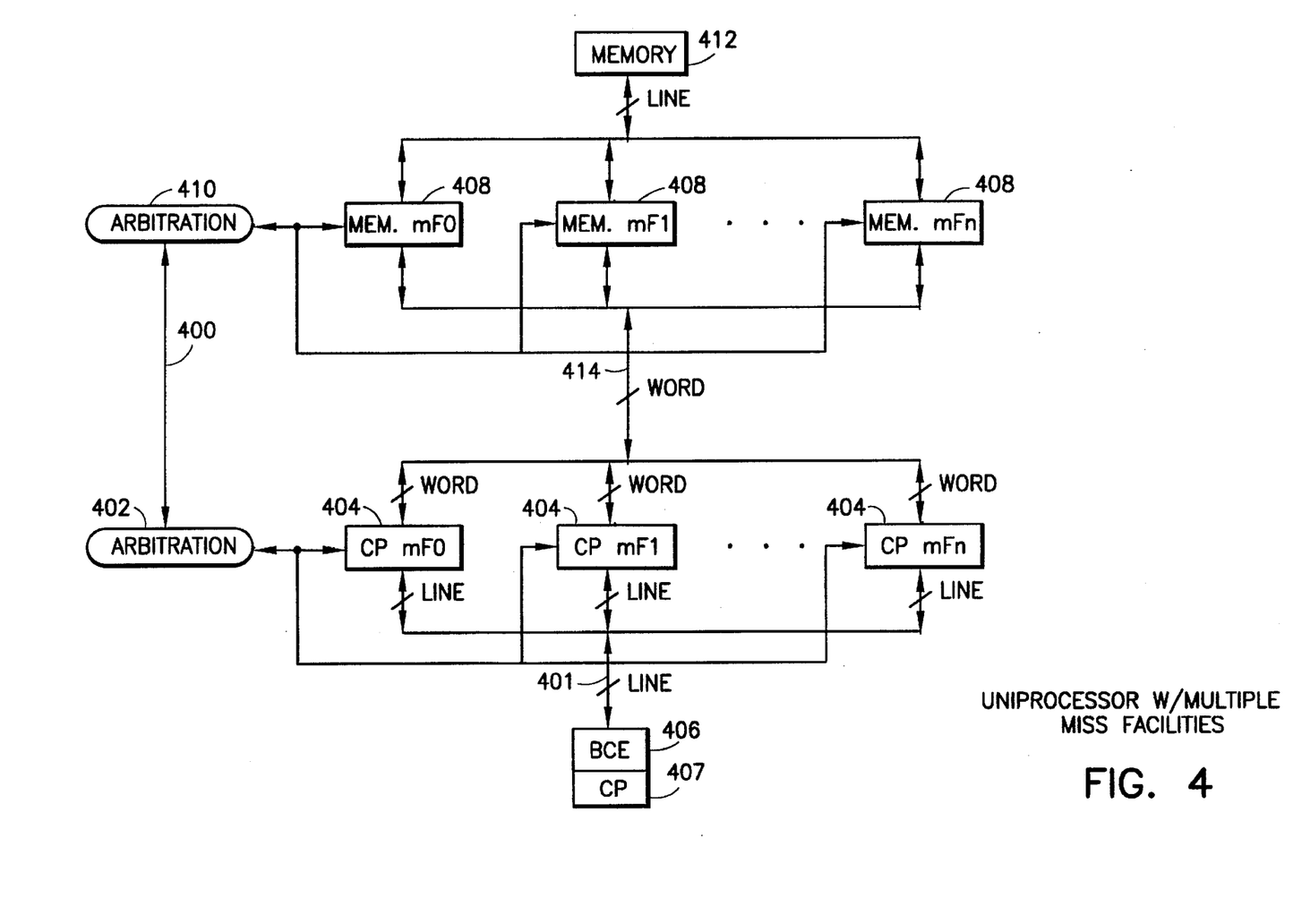
FIG. 4 is a uniprocessor system in accordance with the present invention, employing multiple miss facilities.

FIG. 4 shows a preferred embodiment of the present invention. This uniprocessor system includes multiple miss facilities on each end of the bus. On the processor side of the bus, there is CPMF0, CPMF1, . . . , CPMFn, (each denoted 404) and on the memory side of the bus, there is MMF0, MMF1, . . . , MMFn (each denoted 408).

When the first miss occurs in this system, the processor arbitration-control 402 selects a miss facility, say CPMF0, and it issues the miss to the memory system by sending the address of the miss, along with control information, on the address/control bus 400. The control information tells the memory system that the associated miss is being handled by CPMF0; the arbitration control 410 assigns MMF0 to handle the miss at the memory-end of the bus.

The relevant line is fetched from the memory 412, and put into the line buffer (not shown) of MMF0. The line is then sent across the bus 414, one word at a time. When each word is sent, the memory system sends control signals back to the processor arbitration-control 402 via line 400. These control signals identify the arriving data as being intended for CPMF0. No preemption or priority information transfer is required, since there is no competition for bus 414. The words are buffered in the line buffer (not shown) of CPMF0, and after all words have arrived, the line is transferred en masse from the line buffer of CPMF0 to the BCE 406 via 401, which is at least one line wide.

If no miss ever occurred when another miss was in progress, then CPMF0 and MMF0 would be the only miss facilities that were ever used. This system, and the description of its operation, would then be identical to the system and description of FIG. 1. The only difference would be that control information would be sent back-and-forth with the address and data that specifically requests the use of miss facility #0 on both sides of the bus.

The novel system of FIG. 4 performs a new and useful function when a miss occurs during the processing of another miss, i.e., when a new miss occurs during handshaking between CPMF0 and MMF0.

When the second miss occurs, the processor arbitration-control 402 will find CPMF0 busy The control 402 will choose a new miss facility, say CPMF1, and it will issue the second miss to the memory system by sending the address and some new control information on the address/control bus 400. This control information tells the memory system that the associated miss is being handled by CPMF1; the arbitration control 410 assigns MMF1 to handle the second miss.

In addition, the control information will specify some manner of preemption that is to be used in servicing the second miss while the first miss is in progress. The possible types of preemption include, but are not limited to:

1. NORMAL—process the second miss after the first miss has completed, as done in the existing art. This is the same as "no preemption."

2. EXPRESS—suspend the transmission of data for the first miss, complete the second miss, and then resume the first miss.

3. FIRST DATA ONLY—suspend the transmission of data for the first miss only for one cycle—during which the first word of the second miss is to be transmitted—then complete the first miss, then complete the second miss.

4. INTERLEAVE—interleave the transmitted data from the two misses, using every other cycle.

The address for the second miss is used to fetch the relevant line from memory. That line is stored in the line buffer (not shown) of MMF1. The data in MMF0 and MMF1 is then multiplexed onto the shared bus 414 in the manner that was specified in the preemption control information for the second miss.

Note that as data is transmitted from the memory system to the processor's miss facilities 404, each word will arrive with control information that identifies the appropriate line buffer (not shown)—i.e., that of CPMF0 or CPMF1—into which the data is to be placed. When the last word arrives for a miss, its line buffer is filled, and the contents of that line buffer are transferred to the BCE 406 en masse.

Also note that the processor arbitration-control 402 can identify the first data back from each miss, and can bypass that data through a miss facility directly to the CP 407 as it arrives. This is the nominal operation of a nonblocking cache, as was described earlier.

If there are two misses in progress and a third miss occurs, the mechanism above extends straightforwardly. CPMF2 and MMF2 will be assigned to handle the third miss. The preemption control that is sent with the third miss will define the way in which the traffic associated with the third miss is multiplexed with the aggregate traffic from the first two misses.

The most straightforward extension of this scheme is always to consider the current aggregate data stream from all of the misses in progress to be a single stream. When another miss occurs, the data stream associated with the new miss is aggregated together with the current stream in the manner specified by the new preemption control.

However, the data streams from the various misses can be aggregated in arbitrarily many ways. All that is required is sufficient control information to specify the net aggregation.

Perhaps the most straightforward extension to the scheme is to include a "priority level" along with the preemption control. The priority level is used to apply the preemption control selectively. For example, if the preemption control of a new miss is EXPRESS, then the ongoing miss is preempted only if its priority level is less than or equal to the priority level of the new miss. And if the preemption control of a new miss is NORMAL, but the new miss has a higher priority level than the ongoing miss, the hardware could be made to preempt the ongoing miss anyway.

One use for priority levels is speculative prefetching. That is, if a "miss" is really a speculative prefetch, then the data that is fetched might not be urgently needed; in fact it might never be needed. It is certainly unwise to have a speculative prefetch delay a miss whose data is urgently needed. Therefore, speculative prefetches would be issued with a low priority level, and actual misses would be issued with a higher priority level. Note also that instruction-misses and data-misses might be given different priority levels, as might instruction-prefetches and data-prefetches.

One last note about trailing edge effects that has been ignored so far concerns a different effect. Sometimes two words in a line are far apart in the line but are requested in immediate succession. The second request is not really a "miss" because the miss is issued by the first request, but the second request will be a long-time in coming, only because the words in the line are returned in sequence starting with the first requested word.

In this invention, two miss facilities can be assigned to the same line. One facility will start returning the line beginning with the first referenced word, and the second facility will start returning the line beginning with the second referenced word. This eliminates the last mentioned form of trailing edge effect. The specifics of whether the line is actually fetched twice, transmitted twice, or put into the BCE twice are implementation dependent. All implementations are possible.

In FIG. 4, the multiple miss facilities shown on each side of the bus, together with a specification of how they work—including preemption controls, priority levels, etc.,—are considered to be aggregate entities. Each aggregation will henceforth be called a "multimiss facility" (MMF). The multimiss facility on the processor-side of the bus will be abbreviated CPMMF, and the multimiss facility on the memory side of the bus will be abbreviated MMMF.

Figure 5:
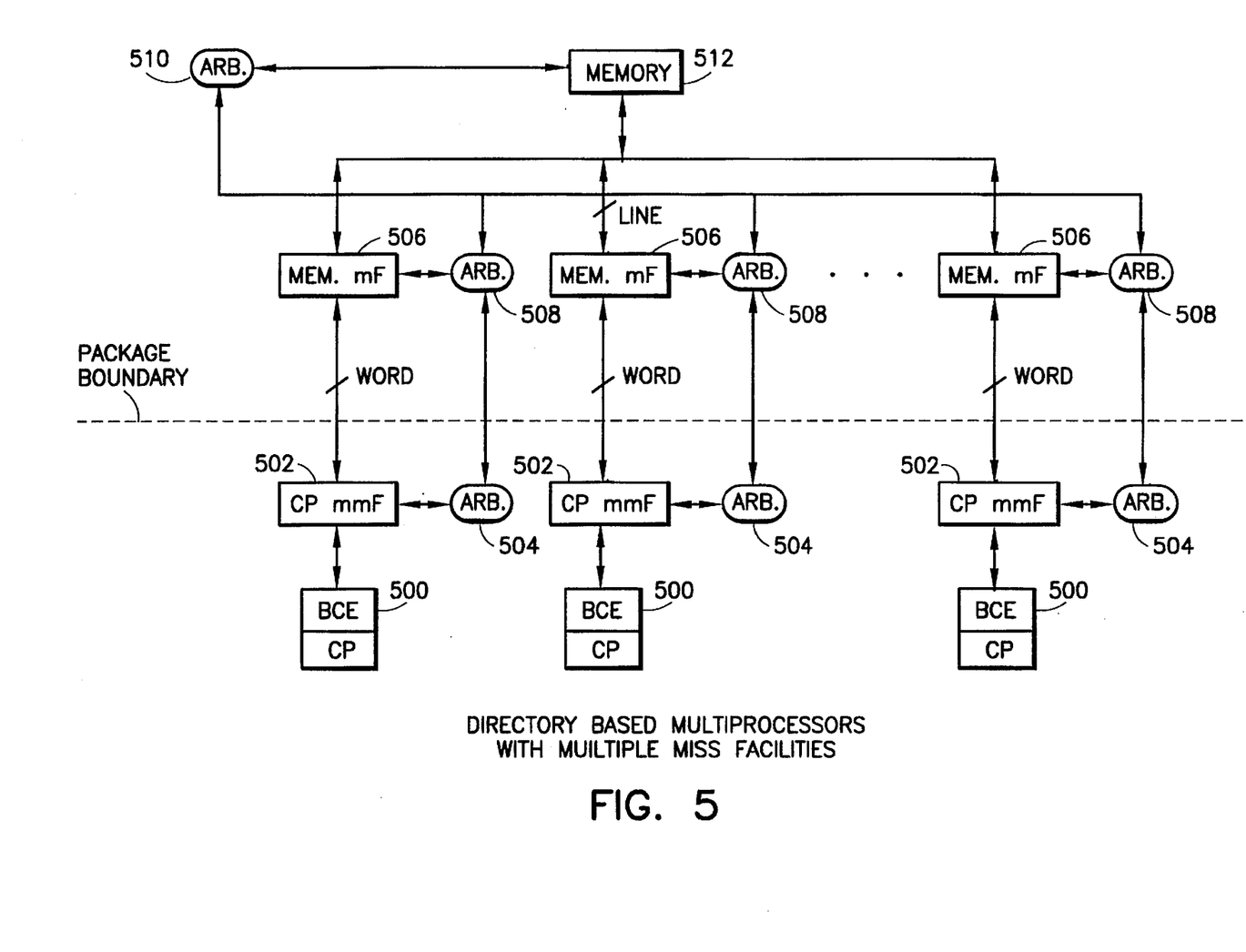
FIG. 5 is a directory based multiprocessor system in accordance with the present invention, employing multiple miss facilities.

FIG. 5 shows an application of this invention to the directory-based multiprocessor environment. Specifically, the environment of FIG. 5 includes CPMMF's (each denoted as 502) and MMMF's (each denoted 506). The CPMMF's and MMMF's each have associated arbitration controls 504 and 508, respectively.

The operation of this system as seen by any uniprocessor 500 in this system is identical to the operation of the system described in FIG. 4. FIG. 5 includes the additional feature of an arbitration control 510 which decides which one of the incoming misses is first allowed to access the memory. This has nothing to do with the bus arbitration—the bus arbitration for each processor's dedicated bus is controlled by that processor's MMMF.

The arbitration control 510 shown in FIG. 5 is the same control as was shown in FIG. 2—it handles only arbitration of memory accesses. In fact, the arbitration controls for the two systems can be identical. Alternatively, the arbitration control 510 for FIG. 5 could be made slightly fancier by using the priority information from the incoming misses to help arbitrate priority at the memory.

The Shared-Bus Multiprocessor

Figure 6:
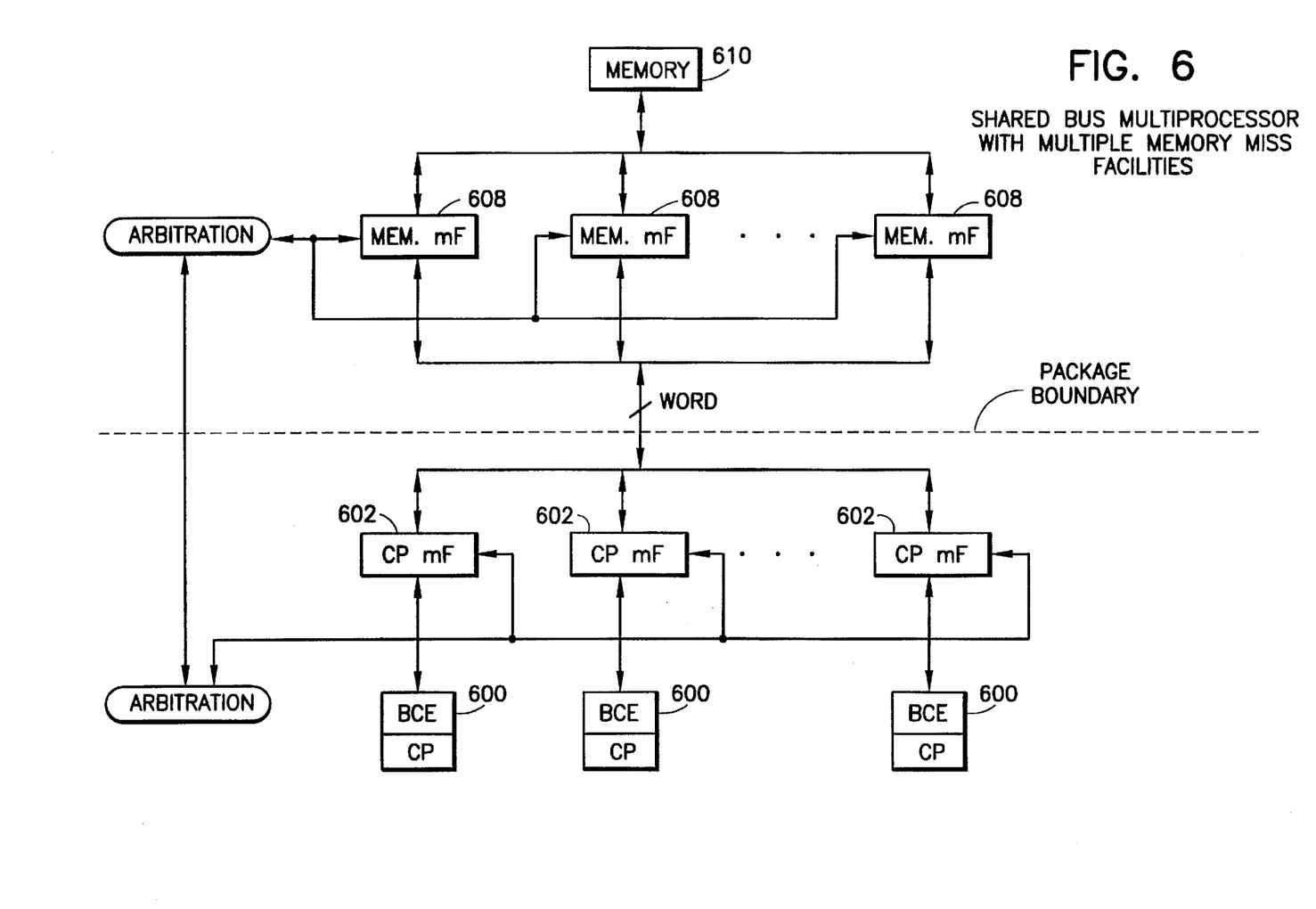
FIG. 6 is a shared-bus multiprocessor system in accordance with the present invention, employing multiple miss facilities.

FIG. 6 shows a second, and very different (albeit analogous) application of the subject invention. FIG. 6 resembles FIG. 3, except that in FIG. 6, multiple miss facilities 608 have been added on the memory-side of the bus.

The reason that this form of the invention is different from the first form of the invention is that in the first form, the MMFs deal with the multiple misses generated by a single processor. The number of miss facilities in the MMF was determined by the maximum number of misses that might be outstanding for a single processor. In this alternative form of the invention, the MMF 608 at the memory-side of the bus—handles misses from a number of different processors. The number of miss facilities in FIG. 6 is equal to the number of processors that share the bus.

In FIG. 6, the processors are the same as the ones shown in FIG. 1. Specifically, each processor in FIG. 6 has a single miss facility; each processor can handle only one miss at a time.

The arbitration control that handled requests from the multiple processors in FIG. 3 is again shown in FIG. 6. One novel feature of FIG. 6 is that the same arbitration control 604 is essentially replicated at the MMMFs 608 to coordinate the handshaking of each MF in the MMMF with the appropriate CPMF 602.

In a slightly more exotic version of FIG. 6, the misses from the aggregation of processors can be issued with the same kinds of preemption controls and/or priority levels as were described for FIG. 4. This will allow the shared bus to be time-multiplexed between the various misses in progress so as to reduce the effective leading edge delay as seen by any of them.

Figure 7:
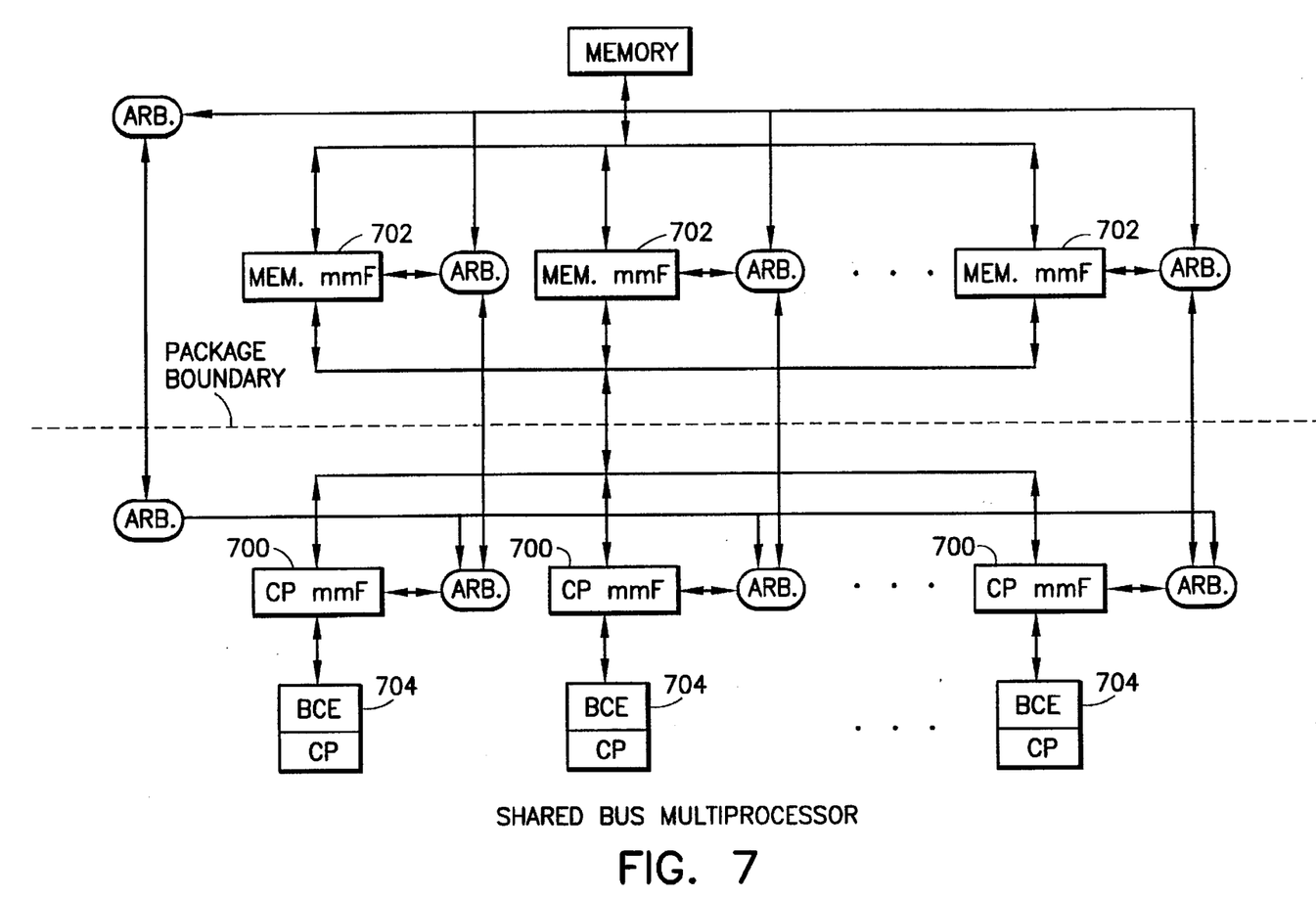
FIG. 7 is a shared-bus multiprocessor system in accordance with the present invention.

FIG. 7 is a modification of FIG. 6. The CPMFs in FIG. 6 have been replaced by CPMMFs 700 in FIG. 7. Further, each miss facility within the memory multimiss facility in FIG. 6 has been replaced with an entire multimiss facility in FIG. 7. Therefore, each MMMF 702 in FIG. 7 is actually a multiplicity of MMMFs. The operation of the system in FIG. 7 follows directly from all previous descriptions of MMMFs, CPMMFs, and bus protocols.

Of course, as drawn in FIG. 7, there is one MMMF 702 per processor 704 in the system, and one MF per outstanding miss in each of the MMMFs. In general, this might be a large number of MFs. It is understood that this structure could be optimized by building only as many MFs on the memory side of the bus as there could be outstanding misses in the entire system at any moment. This would probably yield fewer MFs, and slightly more complex arbitration control.

FIG. 8 is a preferred implementation of the CP miss facilities shown in FIGS. 4–7. The CP miss facility includes a line buffer 800, decoder 802, address register 804, decoder 806, counter 808, incrementers 810, 812 and 814, and state variable register 813. Various logic elements are also included, and the circuit is coupled as shown in FIG. 8.

The line buffer has the capacity to store an entire line of data: in the embodiment shown, eight words. Each word storage location of the line buffer 800 (W0, W1, . . . , W7) is linked directly to a word location in the BCE 801, such that the entire contents of the line buffer can be transferred to the BCE in a single cycle.

A fundamental feature of the miss facility is the existence of various "states". In the miss facility of FIG. 8, the state is controlled by state variable register 813, which itself is controlled by incrementer 812. The state variable register changes its state in response to the incrementing operations of the incrementer 812. Incrementer 812, in turn, produces an incremented output in response to actuation signals from OR gate 816. The inputs to OR gate 816 are the following: 1) the AND (from AND gate 818) of a "facility idle" output from decoder 806, indicating that the miss facility is presently idle, and a "miss" output (line 824) from the BCE 801, indicating that a cache miss has occurred; 2) a carry out output of three-bit counter 808, indicating that an entire line (eight words) has been transferred from memory to the line buffer 800; 3) a "request granted" signal (line 832) from the memory, indicating that a request for a line from memory has been granted; and 4) the AND (from AND gate 820) of the "request granted" output of decoder 806 and a "data valid" output (line 830) from memory, indicating that the first data word has arrived at the line buffer 800.

Cache misses are identified by the address of the word that was sought but not found in the cache; this address is sent to the miss facility. Address register 804 includes an upper portion 804a and a lower portion 804b. Lower portion 804b, or the "word" address portion, will receive the address of the word desired. The upper portion 804a will receive the address of the line containing the desired word. The line and word addresses are supplied to the address register 804 by the BCE 801 via line 822.

State register 813, in the embodiment shown, is a two bit counter, corresponding to the four possible states of the miss facility. Initially the register is at state 0, indicating that the miss facility is idle. When a miss occurs within the BCE, the BCE signals that a miss has occurred by raising the flag marked "miss" on line 824. If the facility is idle (state=0, then the AND gate 818 produces a "1" output, which gates the address register 804, transferring the address of the miss (from line 822) into the register 804. The output of AND gate 818 is also applied to the "clear" input of counter 808, clearing the word counter to zero, and to the input of OR gate 816, producing a "1" output from the OR gate, bumping the state level, thus placing the facility in the "miss request" state (output of decoder 806). The miss request output of the decoder 806 provides a miss request signal to the memory miss facility via line 826. The entire address appearing in the address register 804 accompanies the miss request signal via line 828. (The lines 826 and 828 correspond to, for example, bus 400 of FIG. 4).

Inputs to the CP miss facility from the memory miss facility appear as lines 830, 832 and 834. After the memory miss facility has received a request, it will respond with a signal on the "request granted" line 832. The request granted signal is fed to OR gate 816, which causes the state output from state register 813 to be bumped by one, placing the CP miss facility in the "request granted" state (output of decoder 806). When the request has been granted, the facility waits for data. The end of the wait occurs when the inputs to AND gate 820 are both high. The first input is the "request granted" output of decoder 806, and the other input is the "data valid" signal (line 830) from the memory miss facility. When the inputs to the AND gate 820 are both one, the one output of the AND gate is sent to the processor. This signal indicates that the first datum—which is the word that was actually requested—has arrived, and is available for use by the processor on the CP bypass input line 836. The AND output from gate 820 will also bump the state of 813, placing the miss facility in the "data incoming" state (output of decoder 806).

The data valid signal is also applied to decoder 802 (which decodes the word portion of address register 804), resulting in a write strobe to the appropriate word register within the line buffer. The data valid signal is also applied to incrementer 814, to provide an incremented value of the word offset in the word portion of the address register 804. This increments only the word portion of the address register, so that when the next pulse appears from the data valid line 830, the next word in the line will pointed to. Lastly, the data valid signal will be applied to the counter 808 as a latch signal to latch the incremented value from 810, thereby bumping the count. After the last word is read, the counter 808 will produce a carry out signal, which will be applied to the OR gate 816, which will then bump the state signal at 813, and place the miss facility in the "facility idle" state (output of decoder 806). The carry out signal of the counter 808 will also signal to the BCE via line 838 that the data transfer to the line buffers is complete, and that valid data transfer from the miss facility's line buffer to the BCE can proceed.

Referring now to FIG. 9, a preferred implementation of a memory miss facility as shown in FIGS. 4–7 will now be described. Lines 826, 828, 830, 834 and 836 correspond to the similarly labelled lines in FIG. 8. The memory miss facility further includes a decoder 900, state register 902, address register 904 (including upper portion 904a and lower portion 904b as in 804), multiplexer ("MUX") 906, counter 908, line buffer 910, incrementers 912, 914 and 916, OR gate 918 and AND gates 920 and 922. Also shown in FIG. 9 is memory 922.

Line buffer 910 is coupled directly to memory 922. The output of the line buffer is multiplexed through MUX 906 to a single word, which passes to the CPMF, one word at a time, via line 834. FIG. 9 also includes 3-bit counter 908, for counting the number of words transferred from the line buffer 910 to the CP miss facility of FIG. 8. State register 902 indicates which of four possible states the miss facility is currently in (the output being decoded by decoder 900).

When the miss facility is available, the state of the state register will produce the decoded output of "system available" at the output of decoder 900. When the system is available, art AND gate 920 input is enabled. When a miss request comes from the CP miss facility, the other input of the AND gate 920 will be enabled, producing a one output from AND gate 920. This one output will cause the address coming from the CP miss facility and appearing on line 916 to be latched into address register 904. The output of AND gate 920 also provides an input to OR gate 918, causing the state register to be bumped, changing the state of the miss facility to "miss accepted" (output of decoder 900). The counter is also cleared by the output of AND 920. When the "miss accepted" signal appears at the output of decoder 900, the following three actions take place: 1) a read is initiated to the memory system via line 924 (the output of the address register, line 926, provides the address for the read); 2) the state is bumped again; and 3) a signal is sent to the CP miss facility via line 832, granting the miss request.

Because the memory fetches data on quanta of lines, only the high order portion of the address stored in the address register 904 (that portion of the address stored in upper portion 904a) is sent to the address input of the memory.

As stated, the "miss accepted" output of the decoder bumps the state to the "memory busy" state. In this state, the miss facility is waiting for the memory to fetch the requested data. When the memory has finished accessing data, the data valid output 928 from memory 922 indicates that data is ready to be sent to the line buffer 910. This data valid signal causes the entire line of valid data to be transferred to the line buffer via paths 930. This "data valid" signal from line 928 is also applied to OR gate 918, causing the state of the miss facility to be bumped to the "data outgoing" state.

This will cause data to be sent from the line buffer to the CP miss facility via the data bus 834. When data is outgoing, the output of system bus clock 932 will be applied, along with the "data outgoing" output of decoder 900, to AND gate 922. The output of the AND gate generates a "data valid" pulse on line 830 to be transferred to the CP miss facility. Also, because the particular data word to be sent via the data bus 834 is determined by the word address portion 904b of the address register, the output of AND gate 922 also bumps the count of the word in the word register so that each word in the line is successively sent to the CP miss facility. The output of the AND gate 922 also bumps the count of counter 908, which indicates the number of words already transferred during the current miss. After the last word has been sent, the counter will generate a carry out signal, which will cause the state of the miss facility to be bumped back to the "system available" state.

While the invention has been described in particular with respect to preferred embodiments thereof, it will be understood that by those skilled in the art that modifications to the disclosed embodiments can be made without departing from the spirit and scope of the invention.

We claim:

1. A system for processing concurrent cache misses, comprising:
   a central processor cache;
   a plurality of central processor (CP) miss facilities connected to the processor cache;
   a plurality of memory miss facilities each connected via a coupling means to one or more of the CP miss facilities;
   a memory connected via a bus to each of the memory miss facilities;
   arbitration means coupled to each of the CP miss facilities and each of the memory miss facilities for arbitrating the use of the coupling means connecting the memory miss facilities and the CP miss facilities.

2. The system of claim 1, wherein each of the CP miss facilities is coupled to each of the memory miss facilities.

3. The system of claim 2, wherein the system includes only one processor cache.

4. The system of claim 2, wherein the coupling means is a single bus.

5. The system of claim 2, wherein the coupling means is a plurality of buses.

6. The system of claim 5, wherein the number of buses does not equal the number of memory miss facilities.

7. The system of claim 1, wherein the system comprises a plurality of said processor caches.

8. The system of claim 7, wherein the plurality of CP miss facilities are divided into sets, and wherein each set is associated with a different one of the central processor caches.

9. The system of claim 7, wherein the coupling means is a single bus.

10. The system of claim 7, wherein the coupling means is a plurality of buses.

11. The system of claim 10, wherein the number of buses does not equal the number of memory miss facilities.

12. The system of claim 7, further comprising a second arbitration means coupled to the memory miss facilities for arbitrating the use of the bus connecting the memory miss facilities to the memory.

13. A method for processing concurrent cache misses on a coupling means between a processor cache and a memory, comprising:
   sending a first control signal to the memory along with the cache miss, the control signal indicating which of n cache misses the information on the coupling means corresponds to and which of k preemption schemes is to be used, when servicing the miss; and
   sending a second control signal from the memory to the processor cache, along with a line retrieved from memory, the second control signal indicating which of said n misses the information on the bus corresponds to;

wherein the first control signal further indicates which of m priority levels is to be associated with the miss, the priority level determining whether one or more words in a later occurring miss should be sent to the processor cache before one or more words of an earlier occurring miss.

14. A system for processing concurrent cache misses, comprising:

a central processor cache;

a plurality of central processor (CP) miss facilities connected to the cache;

a plurality of memory miss facilities each connected via a coupling means to one or more of the CP miss facilities;

a memory connected to each of the memory miss facilities;

arbitration means coupled to each of the CP miss facilities and each of the memory miss facilities for arbitrating the use of the coupling means connecting the memory miss facilities and the CP miss facilities.

15. In a data processing system having a processor, a main memory and a cache memory, a method for fetching data, comprising:

sending a first cache request for a first word from the processor to the cache memory;

if the first word is in the cache memory, sending the word to the processor;

if the word is not in the cache memory, sending a first main memory request for the first word from the cache memory to the main memory;

responsive to the first main memory request, sending a first multi-word line of data containing the first word from the main memory to the cache, wherein the first word is sent before any of the other words in the first multi-word line, regardless of the first word's position within the first multi-word line;

sending, before all words in the first multi-word line have been sent to the cache memory by the main memory, a second cache word request for a second word from the processor to the cache memory;

if the second word is in the cache memory, sending the word to the processor;

if the second word is not in the cache memory, sending a second main memory request for the second word from the cache memory to the main memory;

responsive to the second main memory request, sending a second multi-word line of data containing the second word from the main memory to the cache memory, wherein the second word is sent before any of the other words in the second multi-word line, and before any words in the first multi-word line, other than the first word, that have not yet been sent to the cache memory.

* * * * *

UNITED STATES PATENT AND TRADEMARK OFFICE
CERTIFICATE OF CORRECTION

PATENT NO. : 5,636,364
DATED : June 3, 1997
INVENTOR(S) : Phillip G. Emma, Joshua W. Knight III, Thomas R. Puzak It is certified that error appears in the above-indentified patent and that said Letters Patent is hereby corrected as shown below:

Column 2, line 9    delete "buffer 20" and insert --buffer 10--;

Column 7, line 49    after "most" insert --straightforward "wrinkle" on the--; delete "to" and insert --of-- ;

Column 9, line 5    after "bus -" insert --referred to as MMMF-- --;

line 6    after "in" insert --the MMMFs of--;

Column 11, line 30    delete "art" and insert --an--.

Signed and Sealed this

Twenty-fourth Day of November, 1998

Attest:

BRUCE LEHMAN

Attesting Officer      Commissioner of Patents and Trademarks